Dec. 21, 1965     D. T. A. HUIBERS ETAL     3,225,026
METHOD OF PRODUCING AZOBISFORMAMIDES
Filed Feb. 13, 1963
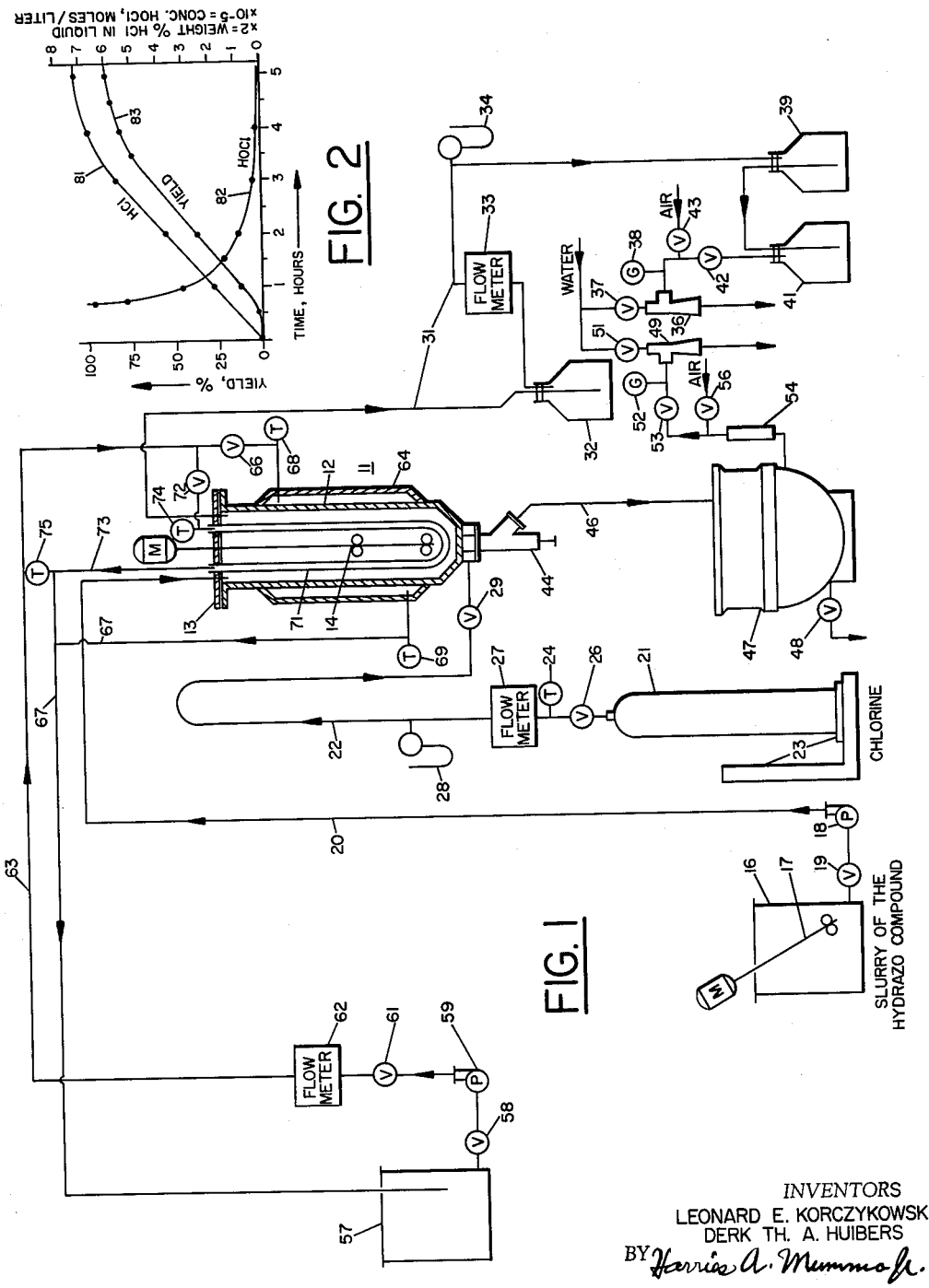
INVENTORS
LEONARD E. KORCZYKOWSKI
DERK TH. A. HUIBERS
BY *Harris A. Mummo Jr.*
ATTORNEY

3,225,026
METHOD OF PRODUCING AZOBISFORMAMIDES
Derk T. A. Huibers, Cheektowaga, Buffalo, and Leonard E. Korczykowski, Buffalo, N.Y., assignors to Wallace & Tiernan Inc., Belleville, N.J., a corporation of Delaware
Filed Feb. 13, 1963, Ser. No. 258,206
12 Claims. (Cl. 260—192)

This invention relates to the production of 1,1'-azobisformamide, $NH_2CON:NCONH_2$, also designated azodicarbonamide, and of azobisformamide having alkyl or cycloalkyl substituents on the amido nitrogen atoms. The invention relates more particularly to a method of producing such azobisformamide compounds by oxidation of biurea, $NH_2CONHNHCONH_2$, also designated hydrazobisformamide or hydrazodicarbonamide, or by oxidation of biurea with the corresponding alkyl or cycloalkyl substitutents on the amido nitrogen atoms.

Azobisformamide is finding great utility as a blowing agent in the manufacture of rubber and plastic foams, and provides upon decomposition gaseous products, notably nitrogen, in relatively large volumes. Modification of the decomposition or blowing temperature is desirable for some applications, and this may be achieved by providing lower alkyl or cycloalkyl substituents on the amido nitrogen atoms. Azobisformamide is useful also in compositions for the treatment of flour to mature it for better functioning in the manufacture of bread and other baked goods. For these uses it ordinarily is desirable to provide the azobisformamide compound in the form of a very fine powder with particles having major dimensions of less than 10 microns.

Over the past 70 years various oxidizing agents have been tried in various environments for converting biurea to azobisformamide. Several methods using sulfuric acid and alkali metal dichromate have been published; good yields of fairly small particles have been obtained, but these reagents can be expensive and inconvenient to handle. High yields have been obtained by employing an inorganic nitrate in an environment of glacial acetic acid, as described and claimed in Patent No. 3,017,406, L. Mehr, assigned to the same assignee as that of the present invention, but the use of these reaction conditions is not always convenient.

It has been reported or suggested also that various compounds containing the hydrazo group may be oxidized to the corresponding compounds containing the azo group by the use of an uncombined or gaseous halogen. The oxidation of symmetrical 1,2-dialkylhydrazines to 1,1-azoalkanes by iodine has been suggested generally. It was reported many years ago that the nitrile 2,2'-hydrazobis(2-methylbutyronitrile) can be oxidized to the corresponding 2,2'-azo compound by adding bromine water to an alcohol-water medium containing the nitrile and cooled with an ice bath. The similar compound 2,2'-hydrazobis (2-methylpropionitrile) has been oxidized in ice water, maintained at 5° to 15° C., to the corresponding 2,2'-azo compound by leading in chlorine gas, with 80% yield. The diethyl ester of bicarbamic acid,

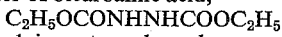

has been stirred in a two-phase benzene-water medium maintained below 15° C. and oxidized to the diethyl ester of azodiformic acid, $C_2H_5OCON:NCOOC_2H_5$, by bubbling chlorine gas into the mixture, with 82% yield.

It is noteworthy that these oxidation reactions have been carried out at temperatures in the range of 0–15° C. Cooling has been found necessary to restrict decomposition reactions, which have been found to be favored at higher temperatures, resulting in unacceptably low yields. In the case of azobisformamide, if produced by oxidizing biurea in an aqueous medium, experience with the oxidation of other hydrazo compounds suggests that higher temperatures, such as room temperature or above, would favor hydrolysis of the azobisformamide produced to give azodiformic acid, which is notoriously unstable and decomposes in the aqueous medium to give nitrogen, carbon dioxide, and hydrogen or water. The prior work also suggests that an agent such as calcium carbonate be added to the reaction system to bind the acid formed during oxidation with chlorine. Some attempts to oxidize biurea with chlorine have resulted in rapid production of nitrogen trichloride, presumably formed in acid surroundings from ammonia produced by a decomposition or hydrolysis reaction. Other attempts to effect oxidation of biurea by chlorine with provision for neutralizing the acid formed have resulted in low yields, and generally such a reaction, carried out at temperatures below 15° C. as indicated hereinabove, gives negligible or very low yields even after several hours.

It is an object of this invention, therefore, to provide a new and improved method of producing azobisformamide compounds, by oxidation of the corresponding hydrazo compounds, which avoids one or more of the disadvantages of the methods proposed by the prior art.

It is another object of the invention to provide a method of producing azobisformamide by oxidation of biurea, using chlorine, to obtain commercially feasible yields.

It is a further object of the invention to provide a new and improved method of chlorine oxidation of biurea in an aqueous system with conversion of at least 70% of the biurea to azobisformamide.

In accordance with the invention, the method of producing an azo compound having the structural formula

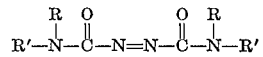

by oxidation of the corresponding hydrazo compound having the structural formula

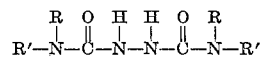

where each of the radicals R and R' is selected from the group consisting of hydrogen, an alkyl radical containing from one to 12 carbon atoms, and a cycloalkyl radical containing from 4 to 7 carbon atoms, comprises suspending particles of the hydrazo compound in an enclosed aqueous reaction system; maintaining chlorine as oxidizing agent dissolved in the system in major proportions relative to chlorine saturation during induction of the oxidation reaction; thereafter supplying chlorine to the aqueous system in amounts generally commensurate with the chlorine consumed as oxidizing agent until at least 70% of the hydrazo compound present has been oxidized to the corresponding azo compound, the temperature of the aqueous system during and after induction of the reaction being maintained within the range of 15° to 40° C. with agitation to provide effective dispersion of the suspended hydrazo compound and of the chlorine supplied; and recovering the corresponding azo compound particles thus formed in the aqueous system by filtering, washing, and drying.

In accordance with a feature of the invention, the method of producing azobisformamide by oxidation of biurea comprises suspending biurea particles in an enclosed aqueous reaction system; maintaining chlorine as oxidizing agent dissolved in the system in major proportions relative to chlorine saturation during induction of the oxidation reaction; thereafter continuing to supply chlorine to the aqueous reaction system until at least 70% of the biurea present has been oxidized to azobisformamide, the temperature of the aqueous system being maintained, as mentioned hereinabove, within the range of 15° to 40° C. with effective agitation; and recovering the azobisformamide particles thus formed in the aqueous system by filtering, washing, and drying.

For a better understanding of the invention, together with other and further objects thereof, reference is had to the following description taken in connection with the accompanying drawing, and its scope will be pointed out in the appended claims.

In the drawing,

FIG. 1 is a diagram, largely schematic in form, of apparatus preferred for use in carrying out the method of the invention, the diagram including indications of the paths and direction of flow of the materials involved; and FIG. 2 is a graphical representation of the progress of the oxidation of biurea to azobisformamide, carried out in accordance with an embodiment of the method of the invention, in terms of yield and of the apparent concentration in the aqueous solution of certain acids derived from the chlorine gas used to effect oxidation.

The method of the invention is effective in producing an azo compound having the structural formula

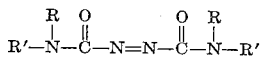

by oxidation of the corresponding hydrazo compound having the structural formula

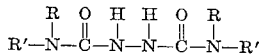

where each of the radicals R and R' is selected from the group consisting of hydrogen, an alkyl radical containing from one to 12 carbon atoms, and a cycloalkyl radical containing from 4 to 7 carbon atoms.

Any of the hydrazo compounds covered by the last-mentioned structural formula may be synthesized by procedures readily available to those skilled in the art. Among these compounds in which substituents are present on the amino nitrogen atoms, the N,N'-disubstituted compounds, where R' is hydrogen, are preferred to the N,N,N',N'-tetrasubstituted compounds, more because of the easier availability of the starting hydrazo compounds and the generally greater desirability for various uses of the azo compounds produced, than because of any difficulty in obtaining good yields of the azo compounds when employing the method of the invention. The total number of carbon atoms in the two radicals R plus those in the two radicals R' (whether or not the latter are hydrogens) ordinarily is not over 24. The use of 1,1,6,6-tetramethylbiurea to produce 1,1'-azobis(N,N-dimethylformamide) exemplifies the method when carried out with tetrasubstituted compounds, in this example the radical R and the radical R' both being methyl radicals. Among the disubstituted compounds, R may be, for example, an alkyl radical such as the ethyl, isopropyl, tert-butyl, or dodecyl radical or a cycloalkyl radical such as the cyclohexyl radical. Thus 1,6-di-tert-butylbiurea may be oxidized to 1,1'-azobis(N-tert-butylformamide), and 1,6-dicyclohexylbiurea may be oxidized to 1,1'-azobis(N-cyclohexylformamide). At present, however, the preferred embodiments of the method of the invention produce azobisformamide itself by oxidation of unsubstituted biurea, the radicals R and R' then being hydrogen.

The method of the invention comprises suspending particles of the hydrazo compound, preferably biurea particles, in an enclosed aqueous reaction system. Referring to the diagram of FIG. 1, showing apparatus for use in carrying out the method, the enclosed reaction system is constituted primarily by a reaction vessel designated generally as 11, and more particularly by the interior tank 12 of the vessel 11, having a removable cover 13. The tank 12 advantageously may have a capacity of about 20 gallons. For agitation of the contents of the tank 12 the shaft of a motor-driven stirrer 14 passes rotably through a suitable fitting (not shown) in the cover 13.

Preparatory to its introduction into the enclosed reaction system, an aqueous suspension of the biurea particles is formed as a slurry of that hydrazo compound in an auxiliary tank 16, which likewise is equipped with a motor-driven stirrer 17. Operation of a pump 18 and valve 19 permits introduction of the suspension or slurry into the reaction tank 12 through piping 20, entering an opening in the cover 13.

Induction of the oxidation reaction may take as long as about an hour. However, heating or cooling the system before introduction of the oxidizing agent, as necessary to obtain a temperature within the range of about 25° to 35° C., may shorten this time to as little as 15 or 20 minutes. To the lengths of time mentioned here for induction period, however, must be added additional time for bringing the chlorine oxidizing agent up to about saturation level in the system. If this is not done by precharging the aqueous medium with gaseous chlorine or with other agents supplying sufficient dissolved chlorine, the total induction period will be, and ordinarily is, from about 40 minutes to about 65 minutes. This period may be preceded by half an hour, more or less, for the aforementioned heating or cooling. All times mentioned naturally are subject to considerable variations in special cases. The recognition and significance of induction will be discussed further hereinbelow. It may be mentioned here, however, that chlorine saturation is reached at a concentration of dissolved chlorine of about 0.06 mole per liter. During induction of the oxidation reaction chlorine should be maintained dissolved in the system in major proportions relative to chlorine saturation, i.e., at a concentration above roughly 0.03 mole per liter for practical purposes, but not substantially exceeding saturation. Saturation can be said to be exceeded when chlorine tends to separate from or pass through the system without being dissolved or being consumed by hydrolysis or other reactions.

For the purpose of introducing gaseous chlorine into the reaction system as the oxidizing agent, there is provided a tank 21 of the compressed gas, connected by suitable piping 22 to a fitting at the bottom of the tank 12. The piping 22 includes a raised loop to prevent passage of the slurry in the reverse direction from the tank 12 toward the chlorine tank 21. To aid in dispensing chlorine in suitable amounts into the system, the tank 21 rests on a scale 23; a thermometer 24 also is inserted in the line 22 to facilitate computation for converting gas volume to weight, the volume permitted to pass through a valve 26 being measured by a flowmeter 27 of the type having a float in a tapered pipe for measuring fluid flow. Control is facilitated by a manometer 28 in the line 22 and a second valve 29 near the point of introduction of the chlorine gas into the tank 12.

Gases may be exhausted from the reaction tank 12 through a vent line 31, which passes from an opening in the cover 13 through a trap 32 and a similar flowmeter 33. At this point in the line 31 a manometer 34 permits reading the line pressure, which is determined in part by the action of an aspirator 36, supplied through a valve 37 with a stream of water for producing a vacuum, as measured by a vacuum gauge 38. Before being exhausted through the aspirator 36, the vented gases pass through another trap 39, a caustic scrubber 41 which may contain a 10% sodium hydroxide solution, and a valve 42. The vacuum may be decreased or relieved by opening a valve 43 to the atmosphere.

For recovering the solid product of the reaction, formed as a suspension of fine particles, the apparatus of FIG. 1 also includes a valve 44, permitting the suspension to pass from the bottom of the reaction tank 12 through a line 46 to a filter crock 47 of the type having a filter cloth which can be removed for cleaning and recovery of the solids. The aqueous filtrate is drained through a valve 48. Filtering is hastened by use of an aspirator 49, supplied with water through a valve 51 for producing a vacuum, as measured by a vacuum gauge 52. Control of the filtering operation is facilitated by a valve 53 and a sight glass 54 in the line from the aspirator 49 to the filter 47. The vacuum in the filter may be relieved by opening a valve 56 to the atmosphere.

After the induction period, when the reaction is proceeding with substantial velocity, it usually is necessary to provide for cooling of the reaction tank 12 to prevent the exothermic reaction from causing excessive temperature rise in the system. In the illustrated apparatus, FIG. 1, this is accomplished through the use of a tank 57 of ice water. The ice water is delivered to the reaction vessel 11 through a valve 58, a pump 59, another valve 61, a flowmeter 62, and piping 63. The reaction vessel includes a jacket 64, into which the coolant may be introduced through a valve 66 and removed through piping 67 for recirculation through tank 57. Thermometers 68 and 69 are provided in the piping at points respectively entering and leaving the jacket 64 to facilitate control of the cooling. For a reaction tank of the size of tank 12 it may be found desirable to effect further cooling by the use of a cooling coil 71 suspended within the tank from the cover 13, through which the ends of the coil pass. Coolant then may be passed into this coil through a valve 72 and removed through a line 73 which joins the piping 67. Thermometers 74 and 75 are provided similarly near the entrance and exit connections respectively to the cooling coil 71. If heating should be required to obtain the desired temperature at the start of the batch operation, it will be obvious that arrangements, not shown in FIG. 1, can be made readily to pass hot water or steam into the line 63 and remove the effluent water from the return line 67 until a suitable initial temperature is reached.

Due to its complexity the reaction mechanism of this process is not fully understood, and the mechanism is not a part of the present invention. Nevertheless, a discussion of a probable mechanism may be helpful. There are indications that the oxidation reaction itself may take place in solution. Dissolved chlorine attacks the relatively large needle-like biurea crystals, many of which are approximately 15–30 microns wide and 20–200 microns long, and may form an N-chloroamide which is more soluble than the hydrazodicarbonamide itself:

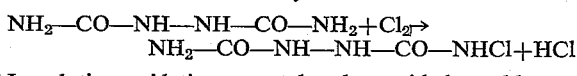

In solution oxidation may take place with hypochlorous acid:

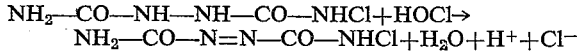

With this reaction mechanism the hypochlorous acid is re-formed in the final hydrolysis, which results in precipitation of the azobisformamide product:

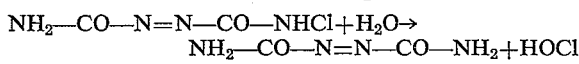

Thus, the reaction is initiated by chlorination of the solid state, while the final step is hydrolysis in the liquid state of N-chloroazobisformamide. There is evidence suggesting that the chlorination with dissolved chlorine is the rate-determining step. The saturation concentration of unhydrolyzed $Cl_2$ dissolved in water is virtually constant at 0.06 mole per liter. An aqueous medium appears to be essential for the process. The hydrochloric acid concentration increases approximately linearly with the reaction time, which causes the hypochlorous acid concentration to decrease continuously according to the equilibrium:

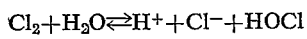

The concentration of hypochlorous acid becomes quite low toward the end of the process. Consequently, it is unlikely that the oxidation rate depends directly on hypochlorous acid. It is likely, on the other hand, that hypochlorous acid is the immediate oxidzing agent. The chlorine hydrolysis can provide enough hypochlorous acid to initiate the reaction, after which a steady state probably is established in which hypochlorous acid is generated by hydrolysis of N-chloroazobisformamide. This reaction must be faster than the reverse reaction of the chlorine hydrolysis.

In carrying out the method of the invention, there is formed in the tank 16 a slurry of biurea particles in water, using the stirrer 17 to maintain a uniform slurry composition. Slurry concentrations of about 5% to 30%, and preferably 10% to 25%, by weight conveniently may be used. An amount of the slurry sufficient almost to fill the reaction tank 12 is transferred by the pump 18 to the tank 12. The valves 26 and 29 then are opened and the valve 26 is adjusted for the desired rate of flow of chlorine gas. The stirrer 14 is operated to effect vigorous agitation of the slurry, thus providing effective dispersion not only of the suspended hydrazo compound but also of the chlorine supplied through the piping 22. For this purpose the use of a reaction tank having a length to diameter ratio greater than 2.5 and equipped with an axial stirrer carrying two or more impellers is advisable. If necessary to create a pattern of agitation providing effective dispersion and good contact among the liquid, solid, and gaseous phases, longitudinal or transverse baffles (not illustrated) advantageously may be provided within the reaction vessel.

Referring now to FIG. 2, the curve 81 represents weight percent of HCl in the aqueous liquid as a fraction of time elapsed after chlorination commences. Some HCl is formed initially along with equimolar amounts of HOCl by hydrolysis of dissolved chlorine. The HOCl believed to be needed to initiate the oxidation reaction apparently is formed by such hydrolysis, and a hydrochloric acid concentration of about 1% by weight also appears to help initiate the reaction. However, a much higher concentration of HCl such as might be obtained if a biurea suspension in dilute hydrochloric acid were charged, instead of starting with a simple aqueous suspension, delays induction of the oxidation reaction. This probably is a result of the HOCl concentration being driven below that needed for efficient induction by the presence of too much HCl. The induction can be hastened somewhat by suspending the hydrazo compound initially in water already saturated with chlorine. When saturation with chlorine is first approached, however, further chlorination should proceed slowly to permit induction without exceeding chlorine saturation. Decomposition of the biurea can occur by reaction with chlorine and water to form nitrogen, carbon dioxide, ammonium chloride, and HCl; amounts of chloride tending substantially to exceed saturation make additional chlorine available in the gas phase for such a side reaction, causing undesirable decomposition of the starting material. Optimum temperature appears to be 30° to 35° C. during the induction period, although 25° C. is quite adequate and any temperature within the range of 15° to 40° C. can be used. When the HCl concentration reaches about 1.5%, induction of the oxidation reaction usually is well established.

Meanwhile, when introduction of chlorine gas is started, the venting arrangement is actuated by setting the valves 37 and 42. The aspirator 36 serves to maintain a vacuum of at least a few millimeters of mercury in the line 31 to insure that exhaust gases are removed through the scrubber 41. The flowmeter 33 then shows the rate of flow of any exit gases which leave the reaction vessel in sufficient quantity to cause a reading on the flowmeter.

Addition to the initial reaction mixture of an agent for neutralizing hydrochloric acid, such as calcium carbonate, may be made, and small additions have been found to increase the assay of azobisformamide in the solid reaction product. However, although it is probable that HCl is a product of at least one step in the chain of reactions involved in the oxidation, it has been discovered nevertheless that after induction the concentration of HCl may be permitted to continue building up as the reaction progresses, as indicated by the curve 81. Accordingly, any agent added initially to neutralize hydrochloric acid should be sufficient in amount only to remove from solution not more than about one gram-equivalent of hydrogen ion per mole of the biurea or other hydrazo compound suspended in the system.

As already indicated, chlorine is maintained dissolved in the system as oxidizing agent in amounts preferably approaching, but not substantially exceeding, chlorine saturation during induction. After induction of the oxidation reaction has occurred, chlorine is supplied to the aqueous system, conveniently in gaseous form, by continuing the flow from the tank 21, preferably at increased rates. As already noted, there need by no further addition to the system of an agent for neutralization of the HCl formed in the system, whether or not some neutralizing agent was supplied initially. Since the reaction appears to be acid-catalyzed, any further addition of a neutralizing agent must be in such small amounts as to preserve definitely acidic conditions. Preferably the hydrogen chloride concentration is permitted to increase unimpeded during the progress of the oxidation process, as illustrated by the curve 81. As the chloride concentration increases, the equilibrium of the chlorine dissolved in water with the hydrochloric acid ions and hypochlorous acid formed therefrom acts to decrease the concentration of the hypochlorous acid. This appears from the curve 82 in FIG. 2, which represents concentration of HOCl in moles per liter as a function of elapsed time. Curve 82 has a greatly expanded vertical scale, since much of the HOCl originally formed recombines with HCl until the HOCl concentration approaches a value as low as $10^{-7}$ mole per liter. Nevertheless, the rate of reaction does not depend on the equilibrium concentration of HOCl. Presumably a substantially constant rate of oxidation can be explained by the continued supply of HOCl under steady state reaction conditions as a result of the final hydrolysis of N-chloroazobisformamide, assuming the reaction mechanism discussed above.

The yield of azobisformamide in percent of the theoretical is shown by the curve 83 in FIG. 2. After induction of the oxidation reaction has occurred and more chlorine is supplied in gaseous form for effecting oxidation of the biurea, there ensues a period in which the rate of azobisformamide formation and the rate of chlorine consumption remain substantially constant. This period is shown by the knee of the curve 83 to have started after about 35 to 40 minutes had elapsed, and is shown by the dropping off of the upper portion of curve 83 to have ended after about 200 to 225 minutes had elapsed. Chlorine then is continued to be supplied during a termination period in which the rates of azobisformamide formation and of chlorine consumption decline substantially and progressively, until the point is reached at which further time would give only negligible further yield. The curve 83 indicates that the termination period ran from about 210 minutes to about 315 minutes elapsed time in the run represented in FIG. 2.

Following induction of the oxidation reaction and at least until the termination period is reached, chlorine is supplied to the aqueous system in amounts generally commensurate with the chlorine consumed as oxidizing agent. The average rate of supplying gaseous chlorine ordinarily is adjusted to provide amounts near the chlorine saturation level and preferably to maintain substantial chlorine saturation. Maintaining exact saturation without any excess chlorine would require first the establishment of chlorine saturation as soon as the induction period ends, since an over-supply of chlorine preferably is avoided during the induction period by supplying somewhat less than needed for saturation. Then just enough chlorine would have to be fed to replace the chlorine consumed by the oxidation process plus any small additional amounts consumed in side reactions. Of course, if during oxidation the chlorine feed rate is lower by an inconsequential amount than that required to maintain saturation, the total reaction period merely is increased slightly due to the slightly lower availability of the oxidizing agent. However, failure to maintain at least substantial chlorine saturation is uneconomical, unnecessary, and undesirable. Substantial saturation is accomplished most conveniently by supplying just enough chlorine so that small amounts pass through the closed system and are indicated on the exit flowmeter 33. The volume of exit gases should be kept as low as practicable, however. For example, the input flowmeter 27 may indicate 20 liters per minute or more while the output flowmeter 33 may indicate about 1 liter per minute most of the time. In any event the average rate of supplying gaseous chlorine to the system should be adjusted, following the induction and at least until the termination period is reached, to maintain substantial chlorine saturation, while still limiting the passage of gaseous chlorine unconsumed through the system to the extent readily permitted by the arrangements provided for measurement and control. In the plant illustrated in FIG. 1 these arrangements include the valves 26 and 29 in the chlorine supply line, the supply meters 27 and 28, and the meters 33, 34, and 38 in the exhaust lines. It usually is impractical to make very frequent adjustments in the chlorine supply, and the flowmeter 33 for measurement of the flow of exhaust gases naturally has a minimum sensitivity, below which slight flow cannot readily and dependably be maintained and detected. Thus a setting of the supply valve 26 may be made giving a reading of exhaust gases on the flowmeter 33 which stays quite near the low end of the meter range for at least 15 minutes, and more frequent or more delicate adjustments are not permitted readily in practice by the measurement and control arrangements provided. In any event the volume of any gases being exhausted from the system should not be permitted, except momentarily, to exceed 5% of the volume of the gaseous chlorine being supplied. It will be understood that the remaining gaseous chlorine, not exhausted, is being consumed within the system, primarily for effecting the oxidation, but that any increase in supply volume after chlorine starts to be exhausted tends to pass through the system and to be added to the exit gases, causing the ratio of input rate to exhaust rate to decrease and wasting the excess chlorine supplied.

As the termination period progresses, the oxidation rate falls off so that progressively less chlorine is consumed per minute. In some instances the chlorine input flow rate may be left at the previously established rate, whereupon more and more chlorine is exhausted until finally practically all of the chlorine is being exhausted. When the flow rates are high and maximum efficiency is desired, however, the chlorine supply should be diminished during the termination period and excessive exhaust flow thus curtailed. When most of the chlorine supplied is being exhausted, the end of the termination period has been reached. The chlorine supply is continued, with such suitable adjustments of flow, to effect conversion of at least 70% of the biurea or other hydrazo compound present to the azobisformamide or other corresponding azo compound. With most reaction systems it is quite practicable to achieve from 85% to about 90% yield in from two and a half to five hours. Accordingly, in the preferred method of the invention, the chlorine supply is continued until at least 85% of the hydrazo compound present has been oxidized to the corresponding azo compound.

The temperature of the aqueous system containing the hydrazo compound and chlorine should be maintained within the range of 15° to 40° C. at all times while chlorine is being supplied to the system, during and after the induction period. After the induction period, cooling ordinarily is called for to prevent the temperature from rising to well above 40°, and highest yields tend to be obtained when the system is maintained thereafter at a temperature of approximately 25° C. This is accomplished in the apparatus of FIG. 1 by actuation of the pump 59 and adjustment of the valves 58, 66, and 72.

The azobisformamide or related azo compound thus formed in the aqueous system then is recovered by filtering the filter 47, aided by use of the aspirator 49. After one or more batches have been processed, the filter cloth is removed and scraped and the product is washed and dried in the conventional manner to provide a solid product having desirably small particle sizes. A particle size distribution in which at least 90% of the number of the particles produced have major dimensions less than 20 microns, and at least 50% have major dimensions less than 10 microns, is obtained readily, and 90% ordinarily have major dimensions less than 10 microns. Roughly spherical particle shapes tend to be produced.

Agitation by means of the stirrer 14 need not be very thorough during the induction period; in fact, excessive agitation at that time can cause unnecessary decomposition from attack on the solid starting material by chlorine bubbles in the vapor phase. Adequate agitation thereafter is vital, however, to avoid undue prolongation of the process. Duration of the process accordingly is subject to considerable variation, depending on size and shape of the enclosed reaction system, type of stirring impellers, and speed of stirrer operation. Effective stirring also give smaller particles of the product by facilitating nucleation and impeding or preventing agglomeration.

Milling the particles of the biurea or other hydrazo compound prior to their introduction into the enclosed reaction system tends to increase the yield. The biurea crystals may have major dimensions of 20–200 microns and minor dimensions of 15–30 microns. Milling in aqueous suspension in a ball mill for 30 minutes in one case increased the yield from about 76% to over 85% with a total elapsed time of 3 hours in each run.

Obviously the avoidance of excess chlorine makes for higher efficiency in terms of chlorine consumption. Chlorine efficiency may be defined as the proportion which the amount of the chlorine oxidizing agent equivalent to the hydrazo compound or biurea oxidized, computed as moles of the azo compound or azobisformamide actually recovered, bears to the total chlorine supplied to the system, computed as moles of $Cl_2$. Chlorine efficiencies of at least 60% ordinarily are obtained readily. Typical values are between 65% and 85%, even with small batches and even when about 90% of the hydrazo compound originally present is oxidized and recovered as the corresponding azo compound.

To obtain the data on which the graph of FIG. 2 is based, 600 grams of biurea in water suspension, 21.5% solids, are charged into a 5 liter flask which is maintained at 27–33° C, and agitated vigorously with a plastic stirrer. Chlorine gas is led in at an average rate of 2.5 grams per minute, and samples containing up to about 15 grams of solids are removed for analyses at about 30 minute intervals until 315 minutes have elapsed.

As an example of a preferred embodiment of the invention, carried out in the apparatus of FIG. 1, the charge contains 7 kg. of biurea in water suspension containing 13% solids by weight. About half an hour may be required to bring the charge to 25° C. Chlorine then is introduced at about 7 liters per minute during the induction period of about one hour, whereupon the chlorine feed rate is increased to about 17 liters per minute. The termination period is reached about 1¾ hours later, at which time the chlorine feed rate is cut back to 7 liters per minute and continued for about another hour. The aqueous medium then contains about 10% HCl by weight. A yield of about 86% is obtained with a chlorine efficiency of above 65%. Other runs under similar conditions produce yields of 83% to 89% with chlorine efficiencies of 65% to 80%. The stirrer shaft in the equipment used carried three agitator blades, arranged for rotation at 1800 r.p.m. Of the particles of azobisformamide produced 95% have major dimensions of less than 10 microns.

Very similar results are obtained in the FIG. 1 equipment by charging with a suspension of 9 kg. of 1,6-ditert-butylbiurea in about 50 liters of water. Similarly, analogous yields are obtained in the same lengths of time using the same approximate weight of 1,6-dicyclohexylbiurea, the method in each case being carried out at roughly 25° C. using about the same chlorine supply rate. The solid products in the latter two cases give assays of about 90% of 1,1'-azobis(N-tert-butylformamide) and 1,1'-azobis(n-cylclohexylformamide), respectively, and net yields of about 84%–88%.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. The method of producing an azo compound having the structural formula

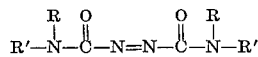

by oxidation of the corresponding hydrazo compound having the structural formula

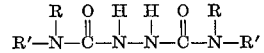

where each of the radicals R and R' is selected from the group consisting of hydrogen, an alkyl radical containing from one to 12 carbon atoms, and a cycloalkyl radical containing from 4 to 7 carbon atoms, comprising: suspending particles of the hydrazo compound in an enclosed aqueous reaction system; maintaining chlorine as oxidizing agent dissolved in the system in major proportions relative to chlorine saturation during induction of the oxidation reaction; thereafter supplying chlorine to the aqueous system in amounts generally commensurate with the chlorine consumed as oxidizing agent until at least 70% of the hydrazo compound present has been oxidized to the corresponding azo compound, the temperature of the aqueous system during and after induction of the reaction being maintained within the range of 15° to 40° C. with agitation to provide effective dispersion of the suspended hydrazo compound and of the chlorine supplied; and recovering the azo compound particles thus formed in the aqueous system by filtering, washing, and drying.

2. The method of producing an azo compound in accordance with claim 1, wherein some of the hydrochloric acid formed by the oxidization reaction is neutralized but only to the extent of removing from solution not more than one gram-equivalent of hydrogen ion per mole of said hydrazo compound suspended in the aqueous system.

3. The method of producing an azo compound having the structural formula

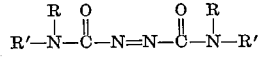

by oxidation of the corresponding hydrazo compound having the structural formula

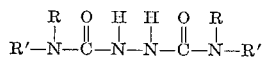

where each of the radicals R and R' is selected from the group consisting of hydrogen, an alkyl radical containing from one to 12 carbon atoms, and a cycloalkyl radical containing from 4 to 7 carbon atoms, comprising: suspending particles of the hydrazo compound in an enclosed aqueous reaction system; maintaining chlorine dissolved in the system as oxidizing agent in amounts approaching but not substantially exceeding chlorine saturation during induction of the oxidation reaction; thereafter supplying chlorine in gaseous form to the aqueous system for effecting oxidation of the hydrazo compound during an ensuing period in which the rate of formation of the corresponding azo compound and the rate of chlorine consumption remain substantially constant, and then during a termination period in which said rates decline substantially and progressively, the average rate of supplying gaseous chlorine to the system being adjusted, following said induction and at least until the termination period is reached, to maintain substantial chlorine saturation, while limiting the passage of gaseous chlorine unconsumed through the system to the extent readily permitted by the arrangements provided for measurement and control and at least to the extent that the volume of any gases being exhausted from the system does not exceed 5% of the volume of the gaseous chlorine being supplied; maintaining the temperature of the system within the range of 15° to 40° C. while chlorine is being supplied to the system, with agitation to provide effective dispersion of the suspended hydrazo compound and of the chlorine supplied; and recovering the azo compound particles thus formed in the aqueous system by filtering, washing, and drying, whereby at least 85% of the hydrazo compound originally present is oxidized and recovered as the corresponding azo compound, and the amount of the chlorine oxidizing agent equivalent to the hydrazo compound oxidized, in moles of the azo compound recovered, is at least 60% of the total chlorine in moles of $Cl_2$ supplied to the system.

4. The method of producing an azo compound in accordance with claim 3, wherein the particles of the hydrazo compound are milled prior to being introduced into the enclosed reaction system.

5. The method of producing an azo compound in accordance with claim 3, wherein the hydrazo compound supplied has the form of biurea particles, the azo compound produced having the form of azobisformamide and being recovered as particles at least 90% of whose number have major dimensions less than 20 microns.

6. The method of producing azobisformamide in accordance with claim 5, wherein the particles of biurea are milled prior to being introduced into the enclosed reaction system.

7. The method of producing azobisformamide in accordance with claim 6, wherein the temperature of the system is maintained at approximately 25° C. following induction of the oxidation reaction.

8. The method of producing azobisformamide by oxidation of biurea, comprising: suspending biurea particles in an enclosed aqueous reaction system; maintaining chlorine as oxidizing agent dissolved in the system in major proportions relative to chlorine saturation during induction of the oxidation reaction; thereafter supplying chlorine to the aqueous system in amounts generally commensurate with the chlorine consumed as oxidizing agent until at least 70% of the biurea present has been oxidized to azobisformamide, the temperature of the aqueous system during and after induction of the reaction being maintained within the range of 15° to 40° C. with agitation to provide effective dispersion of the suspended biurea and of the chlorine supplied; and recovering the azobisformamide particles thus formed in the aqueous system by filtering, washing, and drying.

9. The method of producing azobisformamide in accordance with claim 8, wherein, after induction of the oxidation reaction, chlorine is supplied to the aqueous system in amounts near the chlorine saturation level until at least 85% of the biurea present has been oxidized to azobisformamide.

10. The method of producing azobisformamide by oxidation of biurea, comprising: suspending biurea particles in an enclosed aqueous reaction system; maintaining chlorine as oxidizing agent dissolved in the system in major proportions relative to chlorine saturation during induction of the oxidation reaction; thereafter supplying chlorine to the aqueous system in amounts generally commensurate with the chlorine consumed as oxidizing agent until at least 70% of the biurea present has been oxidized to azobisformamide, the temperature of the aqueous system during and after induction of the reaction being maintained within the range of 15° to 40° C. with agitation to provide effective dispersion of the suspended biurea and of the chlorine supplied, and the hydrochloric acid formed by the oxidation reaction being partially neutralized but only to the extent of removing from solution not more than one gram-equivalent of hydrogen ion per mole of biurea suspended in the aqueous system; and recovering the azobisformamide particles thus formed in the aqueous system by filtering, washing, and drying.

11. The method of producing azobisformamide in accordance with claim 10, wherein the particles of biurea are milled prior to being introduced into the enclosed reaction system.

12. The method of producing azobisformamide by oxidation of biurea, comprising: introducing milled biurea particles as a suspension into an enclosed aqueous reaction system; providing chlorine as oxidizing agent dissolved in the system during induction of the oxidation reaction while maintaining the system at a temperature of 25° to 35° C.; thereafter continuing to supply chlorine to the system in gaseous form in amounts near the chlorine saturation level, while maintaining the system at a temperature of approximately 25° C. with agitation to provide effective dispersion of the suspended biurea and of the chlorine supplied, until at least 85% of the biurea present has been oxidized to azobisformamide; and recovering the azobisformamide particles thus formed in the aqueous system by filtering, washing, and drying.

References Cited by the Examiner
UNITED STATES PATENTS

| | | | |
|---|---|---|---|
| 2,469,358 | 5/1949 | Alderson et al. | 260—192 |
| 2,988,545 | 6/1961 | Hill | 260—192 |

OTHER REFERENCES

B.I.O.S. Final Report, vol. 1150, Item No. 22, pages 21–22.

Ford et al., Jour. Chem. Soc. (1958) p. 1297.

CHARLES B. PARKER, *Primary Examiner.*